US008777179B2

(12) United States Patent
Hess (10) Patent No.: US 8,777,179 B2
(45) Date of Patent: Jul. 15, 2014

(54) DRIVE MECHANISM FOR THE MOVEMENT OF AN OBJECT ALONG AN AXIS OF MOTION AND MICRO-VALVE

(75) Inventor: Peter Hess, Menzingen ZG (CH)

(73) Assignees: Hess Innovation GmbH, Menzingen (CH); Burkert Werke GmbH, Ingelfingen (DE)

(*) Notice: Subject to any disclaimer, the term of this patent is extended or adjusted under 35 U.S.C. 154(b) by 351 days.

(21) Appl. No.: 13/131,026

(22) PCT Filed: Nov. 24, 2009

(86) PCT No.: PCT/EP2009/065747
§ 371 (c)(1),
(2), (4) Date: May 24, 2011

(87) PCT Pub. No.: WO2010/058029
PCT Pub. Date: May 27, 2010

(65) Prior Publication Data
US 2011/0220821 A1 Sep. 15, 2011

(30) Foreign Application Priority Data

Nov. 24, 2008 (CH) .................................... 1821/08
Nov. 24, 2008 (CH) .................................... 1822/08

(51) Int. Cl.
*F16K 31/02* (2006.01)
(52) U.S. Cl.
USPC ....... 251/129.06; 310/328; 310/348; 310/356
(58) Field of Classification Search
USPC .......... 251/129.01–129.06; 310/28, 348, 355, 310/328, 356
See application file for complete search history.

(56) References Cited

U.S. PATENT DOCUMENTS 3,902,084 A 8/1975 May, Jr.
4,874,979 A * 10/1989 Rapp ............................. 310/328
(Continued)

FOREIGN PATENT DOCUMENTS

EP 0 362 613 4/1990
GB 2 338 031 12/1999

OTHER PUBLICATIONS

International Preliminary Report on Patentability for International Application No. PCT/EP2009/065747, dated May 31, 2011.
(Continued)

*Primary Examiner* — John Rivell
*Assistant Examiner* — Matthew W Jellett
(74) *Attorney, Agent, or Firm* — Nixon Peabody LLP (57) ABSTRACT

A drive mechanism for the movement of an object along an axis of motion comprises two clamping elements and a drive element disposed between the two clamping elements which enables a relative movement of the two clamping elements along the axis of motion. Each clamping element comprises a base body and two clamping jaws, wherein a piezo-actuator is disposed between the base body and at least one of the two clamping jaws, which can produce a clamping force acting on the object which is directed transversely to the axis of motion. The base bodies of the two clamping elements are connected by at least two expansible elements. The drive element comprises a further piezo-actuator, which enables the relative displacement of the two clamping elements along the axis of motion. The drive mechanism is suitable for application in a micro-valve.

15 Claims, 12 Drawing Sheets

(56) References Cited

U.S. PATENT DOCUMENTS

| | | | | |
|---|---|---|---|---|
| 4,955,535 | A | * | 9/1990 | Tsutsui et al. ............. 236/12.12 |
| 4,967,794 | A | * | 11/1990 | Tsutsui et al. ................ 137/597 |
| 4,971,106 | A | * | 11/1990 | Tsutsui et al. ................ 137/606 |
| 5,027,027 | A | * | 6/1991 | Orbach et al. ................ 310/317 |
| 5,085,399 | A | * | 2/1992 | Tsutsui et al. ............. 251/30.03 |
| 7,218,035 | B2 | * | 5/2007 | Khajepour et al. ........... 310/328 |
| 7,259,503 | B2 | * | 8/2007 | Pei et al. ...................... 310/363 |
| 2008/0103440 | A1 | * | 5/2008 | Ferren et al. .............. 604/95.01 |

OTHER PUBLICATIONS

Li, Jian et al., "Design and development of a new piezoelectric linear Inchworm® actuator", Mechatronics, vol. 15, Issue 6, pp. 651-681, 2005.

Tenzer, P.E. et al., "On amplification in inchworm™ precision positioners", Mechatronics, vol. 14, Issue 5, pp. 515-531, 2004.

* cited by examiner

DRIVE MECHANISM FOR THE MOVEMENT OF AN OBJECT ALONG AN AXIS OF MOTION AND MICRO-VALVE

CROSS-REFERENCE TO RELATED PATENT APPLICATION

The present application is a National Stage Application of International Application no. PCT/EP2009/065747 entitled "Drive Mechanism For Moving An Object Along An Axis Of Motion And Microvalve," filed Nov. 24, 2009, which claims the benefit of Swiss Patent Application no. 1821/08 entitled "Drive Mechanism For The Movement Of An Object Along An Axis Of Motion," filed Nov. 24, 2008, and Swiss Patent Application no. 1822/08 entitled "Micro-Valve," filed Nov. 24, 2008, the entireties of which are herein incorporated by reference.

TECHNICAL FIELD

The invention relates to a drive mechanism for the movement of an object along an axis of motion, which has very small dimensions lying in the millimeter range or tenths of a millimeter range. The object is in particular a piston or a hollow body. The invention further relates to a micro-valve having such a drive mechanism.

BRIEF DESCRIPTION OF THE INVENTION

It is the object of the invention to develop a drive mechanism having very small dimensions which enables the movement of an object along a linear axis. A further object of the invention is to develop a micro-valve having very small dimensions.

A drive mechanism according to the invention for the movement of an object along an axis of motion comprises two clamping elements and a drive element disposed between the two clamping elements which enables a relative displacement of the two clamping elements along the axis of motion. Each clamping element comprises a base body and two clamping jaws. At least one of the two clamping jaws is displaceable by means of a piezo-actuator to produce a clamping force acting on the object which is directed transverse to the axis of motion. The base bodies of the two clamping elements are connected by at least two expansible elements. The drive element comprises a further piezo-actuator which enables the relative displacement of the two clamping elements along the axis of motion.

The length variation of the piezo-actuator of the first clamping element and/or of the piezo-actuator of the second clamping element and/or of the further piezo-actuator is preferably enlarged by means of an associated hydraulic amplifier.

The base bodies of the two clamping elements and the expansible elements are preferably formed from two half-shells.

The object is, for example, a piston and the two clamping elements are mounted with sliding fit on the piston.

The object can also be a hollow body, wherein the clamping jaws of one of the two clamping elements are mounted with a press fit and the clamping jaws of the other of the two clamping elements are mounted with sliding fit on a piston.

A micro-valve according to the invention comprises such a drive mechanism, a valve housing and a piston as an object moved by the drive mechanism. The valve housing comprises a side wall and a head portion, the side wall running parallel to the longitudinal axis of the piston. The head portion has a first hole which is in alignment with the longitudinal axis of the piston, which receives a front end of the piston and forms a gap seal with the piston. The drive mechanism is accommodated in a chamber in the valve housing.

The piston is, for example, hollow and has an opening which opens into the first hole of the valve housing. The side wall of the valve housing either has a further hole which opens into the first hole and runs perpendicularly or obliquely to the first hole, or the first hole opens into an outlet opening, wherein the cross-sectional area of the first hole is enlarged in a limited section before the outlet opening.

The piezo-actuator of the drive element can be acted upon by an alternating voltage or alternating current whose frequency lies in the ultrasound range.

In this way, a micro-valve can be constructed which has a cylindrical valve housing, the diameter of which is less than 5 mm.

DESCRIPTION OF THE FIGURES

The invention is explained in detail hereinafter with reference to exemplary embodiments and with reference to the drawings.

DETAILED DESCRIPTION OF THE INVENTION

The following exemplary embodiments relate to the case that the object to be displaced is a piston.

Figure 1:
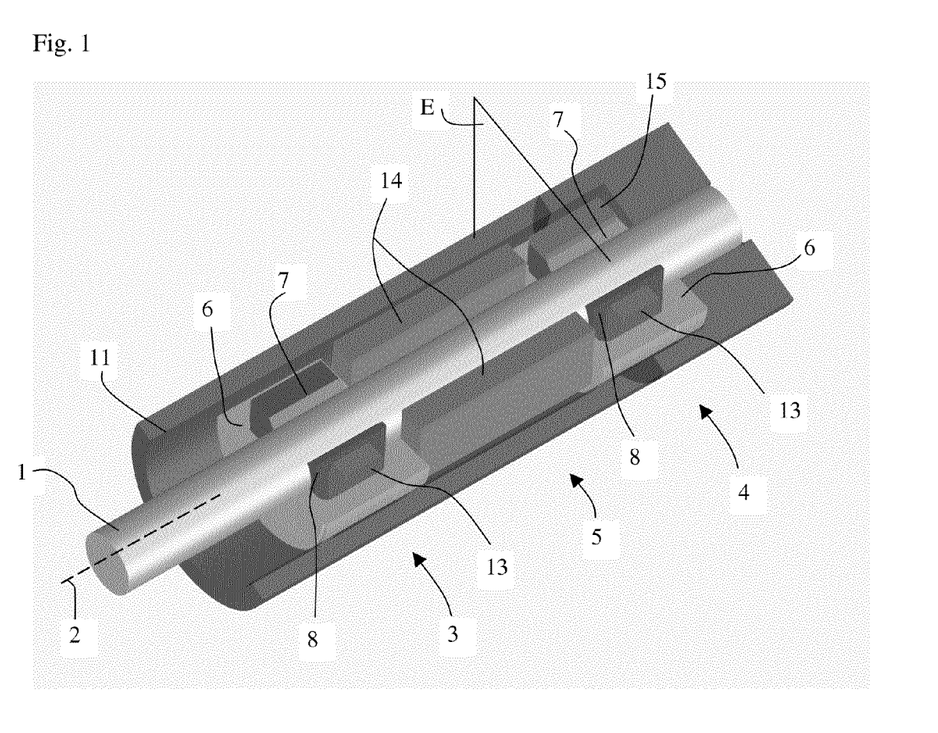
FIG. 1 shows a first exemplary embodiment of a drive mechanism according to the invention comprising two clamping elements and a drive element for the movement of a piston along an axis of motion.
Figure 2:
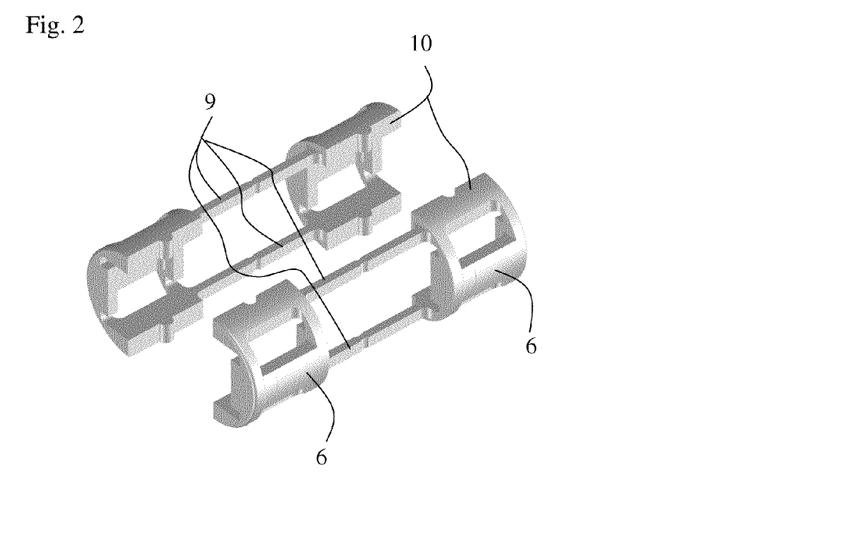
FIG. 2 shows details of the drive mechanism.

FIG. 1 shows a drive mechanism according to the invention for the movement of a piston 1 along an axis of motion 2 in a cutaway, three-dimensional view, i.e. some parts of the individual elements of the drive mechanism were cut away and omitted for reasons of graphical clarity. The axis of motion 2 is a linear axis and is the same as the longitudinal axis of the piston 1. The drive mechanism comprises two clamping elements 3 and 4 and a drive element 5, which enables a relative displacement of the two clamping elements 3 and 4 along the axis of motion 2. The two clamping elements 3 and 4 serve to firmly clamp the piston 1 alternately. Each of the clamping elements 3 and 4 comprises a base body 6 and two clamping jaws 7 and 8. The base bodies 6 of the two clamping elements 3 and 4 are connected by at least two expansible elements 9 (FIG. 2). The base body 6 of the two clamping elements 3 and 4 and the expansible elements 9 advantageously consist of two identical parts, i.e. two half-shells 10 which are put together or from a single part. FIG. 2 shows the two half-shells 10 before they are put together. In this example, a total of four expansible elements 9 connect the two base bodies 6. The expansible elements 9 here are webs which are tapered at the centre so that they allow a variation of their length by a few micrometers. The webs can also have two arms which are angled with respect to one another or which are formed in a meander shape to allow a lengthening without a large expenditure of force. The drive mechanism is located in a housing 11, which is cylindrical here.

Figure 3:
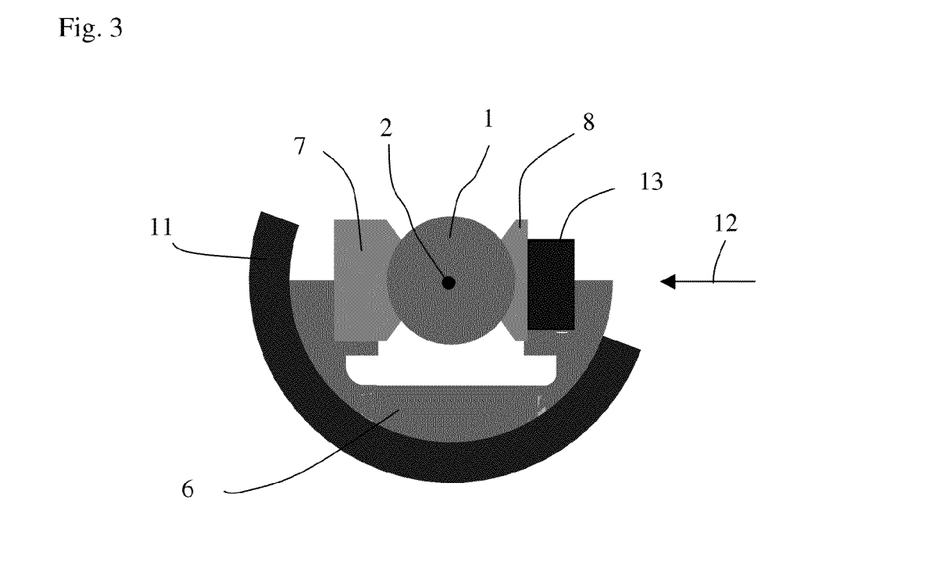
FIG. 3 shows a first exemplary embodiment of the clamping element.

The two clamping elements 3 and 4 have the same structure and the same functional principle. Their structure is therefore only described in detail with reference to the clamping element 3. FIG. 3 shows a first exemplary embodiment of the clamping element 3 in a cross-section running perpendicular to the axis of motion 2, i.e. in the sectional view indicated by the plane E in FIG. 1, in which the clamping jaw 7 is fixed and the clamping jaw 8 is movable in the plane E in a clamping direction 12 running transversely to the axis of motion 2. The clamping jaw 7 is formed as fixed part of the base body 6 or is firmly connected to the base body 6. A piezo-actuator 13 is disposed between the base body 6 and the movable clamping jaw 8. The piezo-actuator 13 is advantageously inserted loosely in the space between the base body 6 and the movable clamping jaw 8 and is secured against displacements along the axis of motion 2 by lateral stops attached in the base body 6. The piezo-actuator 13 enables the displacement of the movable clamping jaw 8 relative to the base body 6 and produces the clamping force with which the clamping jaw 8 presses onto the piston 1.

Figure 4:
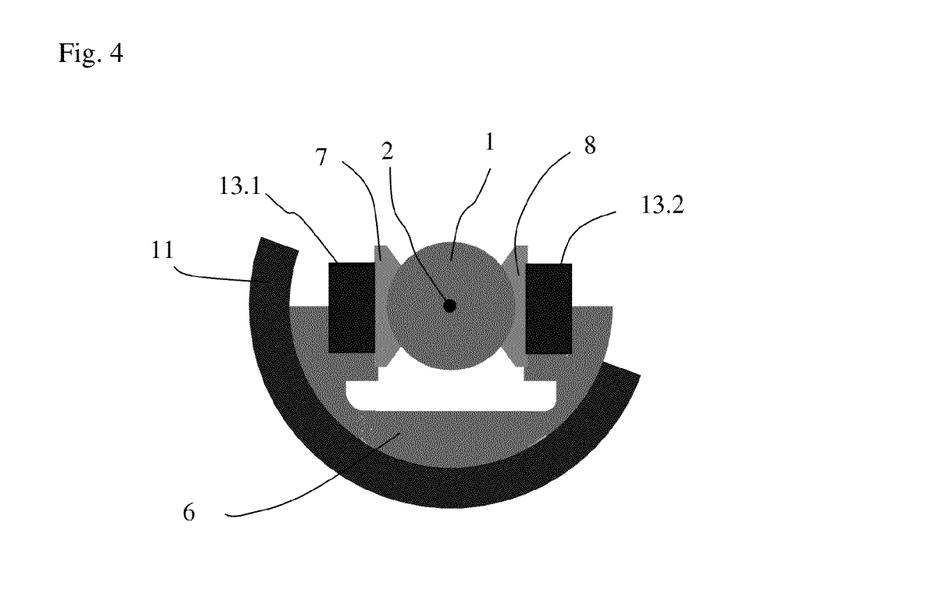
FIG. 4 shows a second exemplary embodiment of the clamping element and FIG. 5 shows a second exemplary embodiment of a drive mechanism according to the invention for the movement of a hollow cylinder along the axis of motion.

FIG. 4 shows a second exemplary embodiment of the clamping jaw 3 in the cross-section indicated by the plane E (FIG. 1). In this example both clamping jaws 7 and 8 are movable and a first piezo-actuator 13.1 is disposed between the first clamping jaw 7 and the base body 6 and a second piezo-actuator 13.2 is disposed between the second clamping jaw 8 and the base body 6. The two piezo-actuators 13.1 and 13.2 are actuated so that they move the two clamping jaws 7 and 8 either towards one another or away from one another.

Referring once more to FIG. 1: the drive element 5 comprises a piezo-actuator 14 which enables a relative displacement of the base bodies 6 of the two clamping elements 3 and 4 along the axis of motion 2. The piezo-actuator 14 is thus secured between the base bodies 6 of the two clamping elements 3 and 4 such that the expansible elements 9 pre-tension the piezo-actuator 14. The expansible elements 9 are basically springs which ensure that the clamping elements 3 and 4 always hold the piezo-actuator 14 under a pre-tension.

The piezo-actuator 14 comprises two stacks of piezo-elements which are disposed on both sides of the piston 1. The two stacks are preferably actuated electrically separately and calibrated by means of a single calibration so that they execute the same stroke.

The piston 1 can have any cross-sectional shape, in particular it can be circular or rectangular. The piston 1 can be hollow. It can be configured to be flat or pointed at one or both ends. The piston 1 can also be an optical fibre or a wire.

The shape of the clamping jaws 7 and 8 is advantageously adapted to the lateral surface of the piston 1 in order to achieve the best possible transmission of force from the clamping jaws 7 and 8 to the piston 1.

The drive mechanism further comprises a control element 15 for controlling its operation. The control element 15 is preferably fastened anywhere on the drive mechanism but can also be disposed outside the drive mechanism. The control element 15 is supplied with power via electrical lines or in a wireless manner or by an integrated battery. The control commands are also supplied via electrical lines or in a wireless manner. The control element 15 is preferably a single semiconductor chip, which is either built into the drive mechanism as a naked semiconductor chip or which is protected in a conventional manner, for example, by means of a so-called "glob top" to protect it from harmful influences.

Each of the piezo-actuators 13, 14 is actuated by the control element 15 in such a manner that it adopts one of two states, i.e. either the "stretched" state or the "contracted" state. Each of the clamping elements 3, 4 also adopts one of two states, i.e. either the "clamping" state or the "non-clamping" state. The "clamping" state is adopted when the relevant piezo-actuator adopts the "stretched" state. The "non-clamping" state is adopted when the relevant piezo-actuator adopts the "contracted" state. The drive element 5 also adopts one of two states, i.e. either the "stretched" state when the piezo-actuator 14 adopts the "stretched" state or the "contracted" state when the piezo-actuator 14 adopts the "contracted" state.

The movement of the piston 1 along the axis of motion 2 takes place with a plurality of successive movement cycles wherein in each movement cycle the clamping elements 3, 4 alternatively firmly clamp and release and in between are displaced relative to one another. The clamping element 3 is disposed in a fixed manner relative to the surroundings, i.e. it does not change its position relative to the housing 11. At the beginning of a movement cycle, the drive element 5 is in the "contracted" state so that the two clamping elements 3 and 4 adopt a predefined spacing A. In order to displace the piston 1 relative to the fixed clamping element 3 and therefore relative to the housing 11, in relation to FIG. 1, from left to right, a movement cycle comprises the following four steps:

1. The clamping element 3 is brought into the "non-clamping" state and the clamping element 4 is brought into the "clamping" state.
2. The drive element 5 is brought into the "stretched" state. In so doing, the clamping element 4 is displaced by a predetermined distance $\Delta a$ to the right, i.e. the distance between the two clamping elements 3 and 4 is enlarged to the distance $A+\Delta a$. In this step the clamping element 4 entrains the piston 1 and thereby displaces it by the distance $\Delta a$ to the right.
3. The clamping element 3 is brought into the "clamping" state and the clamping element 4 is brought into the "non-clamping" state.
4. The drive element 5 is brought into the "contracted" state. In so doing, the clamping element 4 is displaced by the distance $\Delta a$ to the left, i.e. the distance between the two clamping elements 3 and 4 is reduced again to the original distance A.

The drive mechanism can be implemented in various sizes. In the smallest case, the linear dimensions are only a few tenths of a millimeter, for example, 0.3 millimeter. In this case, the piezo-actuators are very small having a size of typically 0.1 mm*0.1 mm*0.05 mm and consequently enable only a small stroke, i.e. the length difference between the "contracted" state and the "stretched" state is only a few micrometers, typically about one micrometer. The drive mechanism can also have linear dimensions of a few millimeters. The width of the piston 1 measured transverse to the axis of motion 2 must therefore be adapted to the distance between the clamping jaws 7 and 8 with high precision so that the clamping jaws 7 and 8 are able to clamp the piston 1 at all with this small stroke of the piezo-actuator 13. The construction of the base body 6 and the clamping jaws 7 and 8 is advantageously designed so that the clamping jaws 7 and 8 are mounted on the piston 1 with sliding fit. The clamping jaws 7 and 8 are advantageously an integral part of the base body 6, i.e. they are connected to the base body 6 via solid articulations.

If the stroke of the piezo-actuator 14 of the drive element 5 is two micrometers, then 500 movement cycles are required to displace the piston 1 by one millimeter along the axis of motion.

Preferably a sensor is integrated in the drive mechanism which enables measurement of the position of the piston 1 in relation to the drive mechanism. The sensor can, for example, be formed by electrical contacts which close when the piston 1 has reached a predetermined position.

The following exemplary embodiments relate to the case that the object to be displaced is a hollow body which is displaced relative to a fixed part, for example, a piston.

Figure 5:
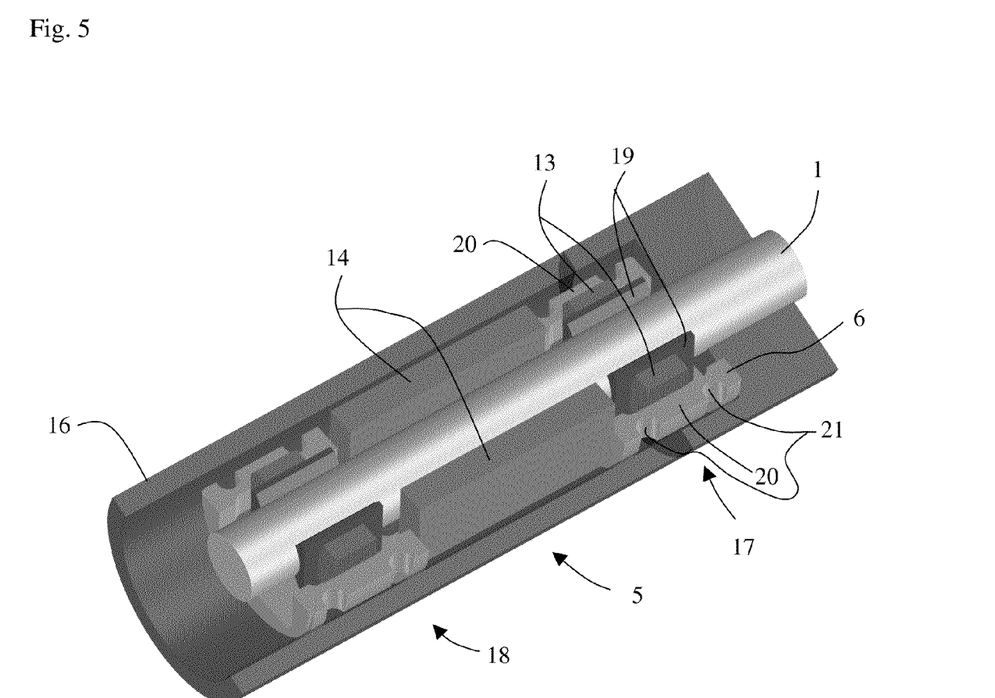

FIG. 5 shows a drive mechanism which is disposed in a hollow body 16 and has the ability to move the hollow body 16 relative to the piston 1 along the axis of motion 2. The cross-section of the hollow body 16 is, for example, round, i.e. the hollow body 16 is a hollow cylinder. Examples of hollow cylinders are tubes or sleeves or the like. The drive mechanism in turn contains two clamping elements 17 and 18 which, as in the previous example, comprise base bodies 6 connected by the expansible elements 9 (FIG. 2). The expansible elements are not visible in this figure. The two clamping elements 17 and 18 have a similar structure and a slightly different functioning principle. The clamping element 17 comprises two support surfaces 19 which are preferably fastened on the piston 1 with press fit as well as at least one movable clamping jaw 20 and a piezo-actuator 13 disposed between the support surface 19 and the movable clamping jaw 20. In the example, respectively one movable clamping jaw 20 with associated piezo-actuator 13 is provided on both sides of the piston 1. The piezo-actuator 13 enables the displacement of the movable clamping jaw 20 relative to the base body 6 and produces the clamping force, wherein however in this example the clamping jaw 20 is not pressed against the piston 1 but against the inner wall of the hollow body 16.

The clamping jaw 20 is connected to the base body 6 via at least two webs 21. The base body 6, the webs 21 and the clamping jaw 20 are made of one piece of material, the webs 21 therefore form a solid hinge. The piezo-actuator 13 is disposed between the support surface 19 and the movable clamping jaw 8. If the piezo-actuator 13 is acted upon by a voltage in such a manner that it expands, the movable clamping jaw 20 is then pressed outwards, when viewed from the centre of the base body 6. This enables the clamping element 3 to be press-fitted in the hollow body 16. In the example with two movable clamping elements 20 disposed on both sides of the piston 1, the clamping element 3 is press-fitted in the hollow body 16 on both sides of the axis of motion 2.

The clamping element 18 only differs in one point from the clamping element 17, i.e. in that the support surfaces 19 do not firmly clamp the piston 1 but rests on the piston 1 with sliding fit. Whereas the clamping element 17 is firmly connected to the piston 1, whether this be in the manner described or in another manner, the clamping element 18 is movable to and fro along the piston 1 by means of the drive element thanks to the sliding fit.

In order to displace the hollow body 16 relative to the piston 1, with reference to FIG. 5, from left to right, a movement cycle comprises the following four steps, wherein at the beginning of a movement cycle the drive element 5 is located in the "contracted" state and therefore the two clamping elements 17 and 18 are located at the distance A:

1. The clamping element 17 is brought into the "clamping" state and the clamping element 18 is brought into the "non-clamping" state. The clamping element 17 is now anchored fixedly in the hollow body 16.

2. The drive element 5 is brought into the "stretched" state so that it displaces the clamping element 18 by a predetermined distance $\Delta a$ to the left, i.e. the distance between the two clamping elements 17 and 18 is enlarged to the distance $A+\Delta a$.

3. The clamping element 18 is brought into the "clamping" state and the clamping element 17 is brought into the "non-clamping" state. The clamping element 18 is now anchored in the hollow body 16.

4. The drive element 5 is brought into the "contracted" state. In so doing, the clamping element 18 is displaced by the distance $\Delta a$ to the right, i.e. the distance between the two clamping elements 17 and 18 is reduced again to the original distance A, whereby the hollow body 16 is moved with the clamping element 17 whilst the clamping element 17 is anchored on the piston 1 and retains its position.

In each movement cycle the hollow body 6 is displaced by a pre-determined, very small distance of typically one to five micrometers. The movement of the hollow body 16 along the piston 1 therefore takes place with a plurality of successive movement cycles.

Figure 6:
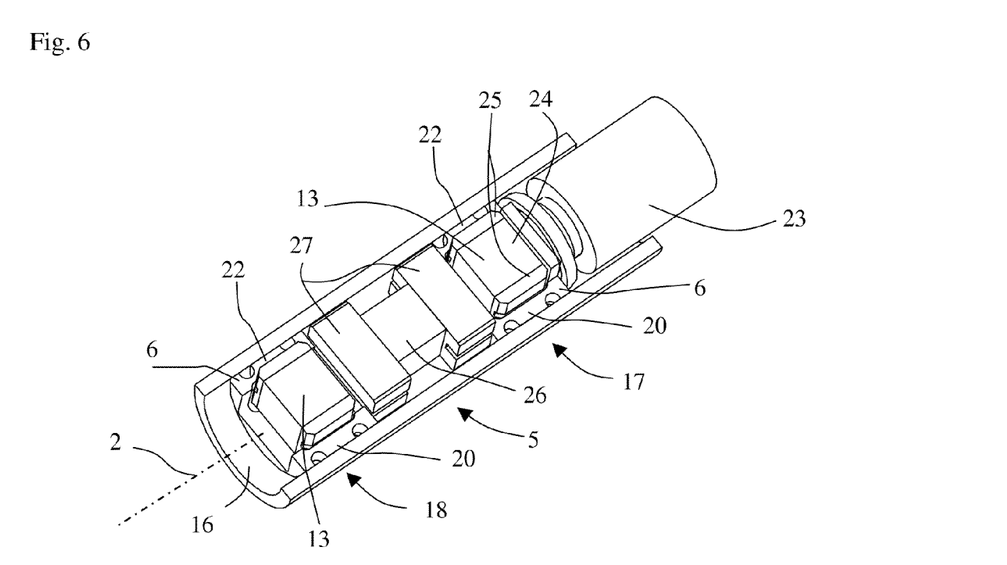
FIG. 6 shows a third exemplary embodiment of a drive mechanism according to the invention.

FIG. 6 shows a three-dimensional sectional drawing of another drive mechanism which is disposed in a hollow body 16 and is capable of moving the hollow body 16 relative to the clamping element 17 or a support 23 connected to the clamping element 17 along the longitudinal axis of the hollow body 16. The axis of motion 2 is therefore the longitudinal axis of the hollow body 16. The hollow body 16 is cutaway for reasons of graphical clarity. The drive mechanism comprises the two clamping elements 17 and 18 and the drive element 5. The expansible elements which connect the base bodies 6 of the two clamping elements 17 and 18 are not visible in this figure. The clamping element 17 and the clamping element 18 each comprise two clamping jaws 20 and 22 which are displaceable perpendicular to the axis of motion 2 and a piezo-actuator 13 disposed between the two clamping jaws 20 and 22, which each produce the clamping force directed perpendicular to the axis of motion 2. The clamping jaws 20 and 22 are a part of the base body 6 and are connected to this by means of a solid articulation in the form of thin webs. The piezo-actuator 13 consists of a stack 24 of many piezo-elements which are terminated on both sides by a ceramic plate 25, wherein in the clamping state of the clamping element the ceramic plates 25 press the clamping jaws 20 and 22 thereof onto the inner wall of the hollow body 16. The drive element 5 is a piezo-actuator consisting of a stack 26 of many piezo-elements which in this example is terminated on both sides by a ceramic body 27 and in operative communication with the non-visible expansible elements serves to move the clamping element 18 to and fro relative to the clamping element 17 along the axis of motion 2.

Figure 7:
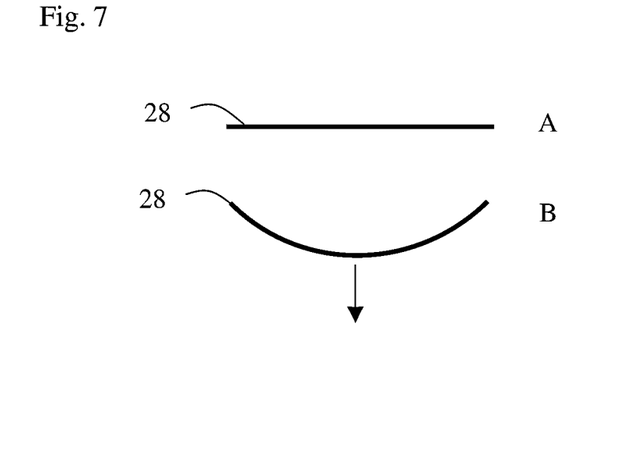
FIG. 7 shows a piezo-cantilever.

FIG. 7 shows schematically and when viewed from the top a piezo-cantilever 28 which can be inserted in the clamping elements 3, 4, 17, 18 instead of the piezo-actuator 13 composed of many piezo-elements (for example FIG. 1). The piezo-cantilever 28 can occupy two states A and B, namely the "straight" state and the "bent" state. The "contracted" state of the piezo-actuator 13 corresponds to state A of the piezo-cantilever 28, the "stretched" state of the piezo-actuator 13 corresponds to state B of the piezo-cantilever 28. The piezo-cantilever 28 produces the clamping force when it is located in state B. The direction of the clamping force is indicated by the arrow.

It is furthermore possible to arrange the piezo-actuator 13 (e.g. FIG. 1) or the piezo-actuators 13.1 and 13.2 (e.g. FIG. 4) such that its/their length variation runs parallel or obliquely to the axis of motion 2 of the piston 1 and to transmit the variation of its length by means of a lever to the corresponding clamping jaws.

Figure 8:
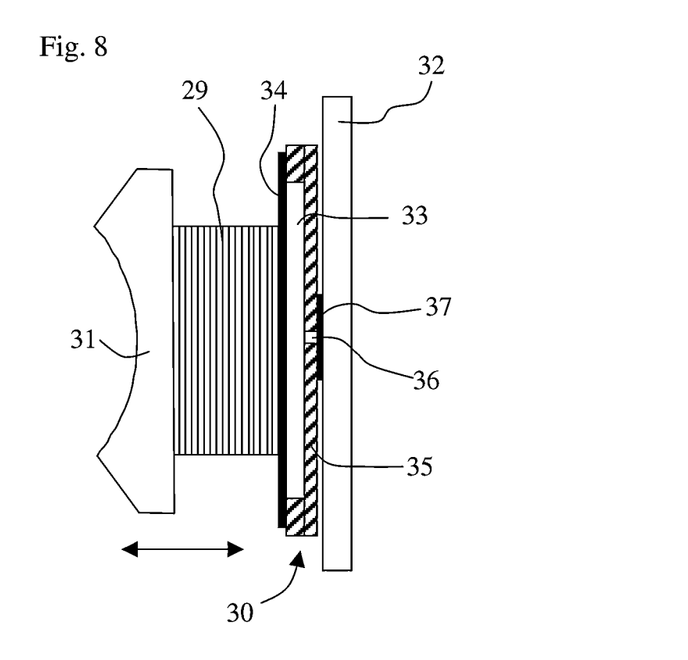
FIGS. 8 to 10 show a clamping element with an integrated hydraulic amplifier and FIGS. 11 to 17 show micro-valves.

FIG. 8 shows in section a piezo-actuator 29, whose stroke is enlarged by a hydraulic amplifier 30. The piezo-actuator 29 and the hydraulic amplifier 30 are inserted or clamped in series between a movable clamping jaw 31 and a fixed support 32. The piezo-actuator 29 and the hydraulic amplifier 30 are therefore coupled to one another. An arrow shows the direction of motion of the clamping jaw 31 and the piezo-actuator 29. The support 32 can be a part of the base body 6 (FIG. 1) or a part of the housing. The piezo-actuator 29 consists of a stack of piezo-elements. The hydraulic amplifier 30 serves to enlarge the length variation of the piezo-actuator 29 by a predetermined factor so that, for example, a length variation of the stack of piezo-elements by 2 μm brings about a length variation of the hydraulic amplifier 30 by 20 μm. The hydraulic amplifier 30 comprises a chamber 33 filled with liquid which is delimited on one side by a first flexible membrane 34. On the side opposite the membrane 34 the chamber 33 contains a compared to the membrane 34 rigid wall 35 with a thin hole 36. A second flexible membrane 37 is fastened on the outer side of the wall 35, which membrane covers the hole 36 so that a closed space is formed between the second membrane 37 and the wall 35. When the piezo-actuator 29 is actuated and consequently acts on the membrane 34, liquid from the chamber 43 is pressed into the closed space. As a result, the clamping jaw 31 is deflected by a multiple of the length variation of the piezo-actuator 29.

Figure 9:
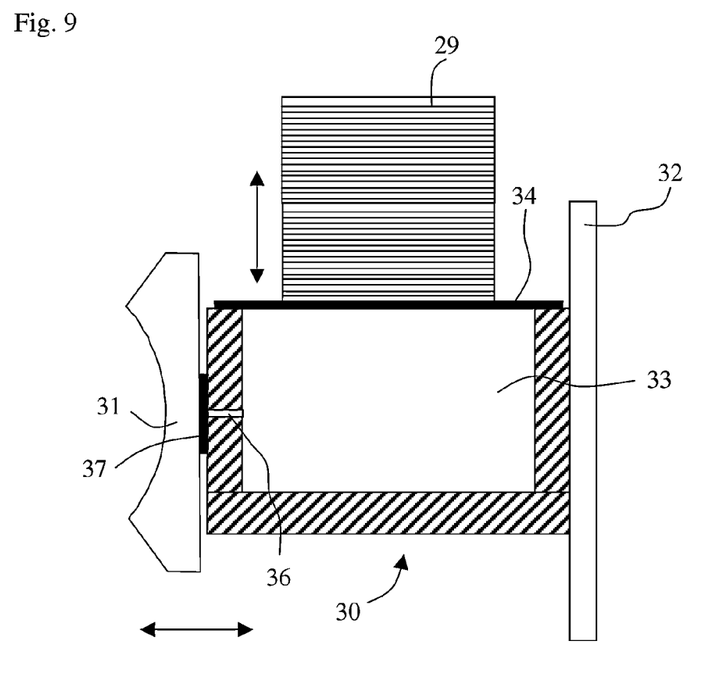

FIG. 9 shows in cross-section a hydraulic amplifier 30 which is disposed between a fixed support 32 and a movable clamping jaw 31. The hydraulic amplifier 30 in turn has two membranes 34 and 37, where a hole 36 connects the chamber 33 of the hydraulic amplifier 30 to the second membrane 37. In this hydraulic amplifier 30 the two membranes 34 and 37 are arranged at right angles to one another. This has the result that the length expansion of the piezo-actuator 29 in a predefined direction brings about a length expansion of the hydraulic amplifier 30 in a direction perpendicular thereto. Arrows indicate the different directions of movement of the clamping jaw 31 and the piezo-actuator 29. This enables the piezo-actuators 13 of the clamping elements 3, 4 to be arranged transversely to the clamping direction in the drive mechanism and therefore allows a longer piezo-actuator to be used.

Figure 10:
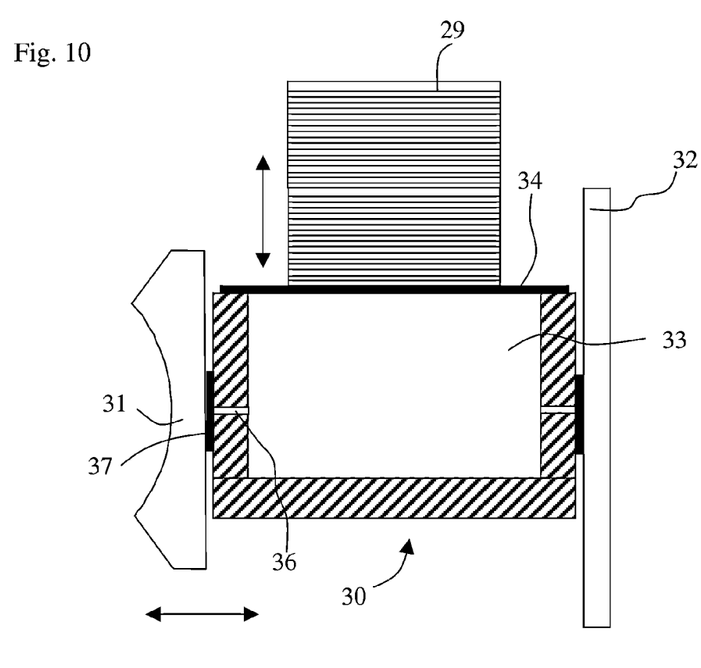

FIG. 10 shows in section a further development of the hydraulic amplifier 30 according to FIG. 9 in which two membranes 37 are arranged on mutually opposite sides, both being connected to the chamber 33 via respectively one hole 36.

The piezo-actuators 13 of the clamping elements 3, 4 and also the further piezo-actuator 14 can be replaced by such a combination of piezo-actuator and hydraulic amplifier.

The drive mechanisms according to the invention can be used in very many applications in which a small overall size is important, for example, in micro-valves. In a further development the control element 15 (FIG. 1) is set up to also act upon the piezo-actuator 14 of the drive element 5 with an alternating voltage or alternating current, whose frequency lies in the ultrasound range, in particular in the range of a few kilohertz to a few megahertz. If one clamping element is firmly connected to the surroundings and at the same time does not firmly clamp the piston 1 and if the other clamping element is freely movable and firmly clamps the piston 1, the drive element 5 acted upon by ultrasound transmits the ultrasound to the piston 1 so that its co-vibrating end can be used for welding. This vibrating end of the piston 1 is preferably configured to be pointed for this purpose.

It is also possible to arrange a plurality of drive mechanisms successively, where the drive mechanisms have the piston 1 or a fibre or a wire or the like in common, the drive mechanisms being jointly or individually controllable.

The drive mechanism according to the invention is suitable, for example, for the building of substantially cylindrical micro-valves having a diameter of less than 5 mm, in extreme cases less than 0.4 mm. FIGS. 11 to 17 show examples of different micro-valves, the same reference numbers as above being used for the reference numbers of the drive mechanism of the micro-valve.

Figure 11:
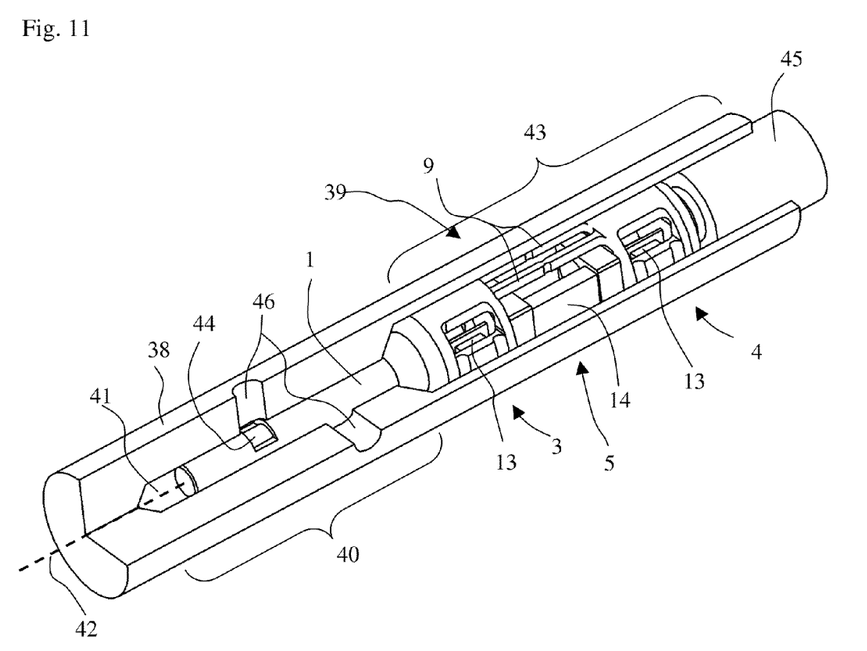

FIG. 11 shows a first exemplary embodiment of a micro-valve according to the invention for controlling and/or regulating the flow of a fluid in various designs and operating states. The fluid can be a gas such as, for example, air, a fluid or an adhesive. The micro-valve comprises a valve housing 38, a piston 1 and a drive mechanism 39 in order to move the piston 1 to and fro in the valve housing 38 along the longitudinal axis of the piston 1. The piston 1 is hollow. In FIG. 11 the valve housing 38 is cut away so that the parts located in the interior are clearly identifiable. The valve housing 38 comprises a head portion 40 having a first hole 41 which receives the front part of the piston 1 and forms a gap seal with the piston 1, i.e. the diameter of the first hole 41 is only a few micrometers, for example, two micrometers greater than the diameter of the piston 1. The first hole 41 can be a through hole or as in the example, a blind hole. The valve housing 38, the piston 1 and the first hole 41 have a common longitudinal axis 42. The valve housing 38 has a side wall running parallel to the longitudinal axis 42. The valve housing 38 further comprises a chamber 43 which adjoins the head portion 40 and receives the drive mechanism 39. The piston 1 is preferably a tube, the front end whereof is closed and the rear end whereof is connected to an inlet 45 for the supply of fluid. The side wall of the piston 1 contains an opening 44 which opens into the first hole 41. The valve housing 38 contains at least one further hole 46 which opens into the first hole 41. The hole 46 runs obliquely or preferably perpendicularly to the first hole 41. In the example, the valve housing 38 contains two holes 46. The valve housing 38 can be fabricated from a single piece of material or it can be composed of a plurality of part bodies.

The fluid is drained via one of the holes 46 as soon as the opening 44 in the piston 1 is aligned with this hole 46 because this hole 46 in the valve housing 38 and the opening 44 in the piston 1 then form a common continuous flow channel which opens into the cavity of the piston 1. If the number n of holes 46 is n=1, then the micro-valve is a one-way valve which can be used as an ON-OFF valve or as a proportional valve. If the number n of holes 46 is n>1, then the micro-valve is a multi-way valve. The n>1 holes are then arranged offset along the longitudinal axis 42 of the micro-valves, where they can point in the same direction or as in the example in different directions. If the opening 44 is in alignment with the hole n=m, the micro-valve is in the "open m" state. In the example with n=2, there are two open states, i.e. the states "open 1" and "open 2". If the micro-valve is in the "closed" state, the inner wall of the first hole 41 of the valve housing 38 then seals the opening 44 in the piston 1. The change from the "open" state or one of the "open m" states with m=1 . . . n into the "closed" state is made by the drive mechanism 39 displacing the piston 1 relative to the valve housing 38. The opening 44 in the piston 1 is therefore in alignment with the first of these holes 46 if the piston 1 is in a first position and with the second of these holes 46 if the piston 1 is in a second position, etc.

In this micro-valve the clamping element 4 is connected directly or indirectly to the valve housing 38, i.e. the position of the clamping element 4 does not vary in relation to the position of the valve housing 38. In order to displace the piston 1 relative to the fixed clamping element 4 and therefore relative to the valve housing 38, in relation to FIG. 11, from right to left, a movement cycle comprises the four steps described further above.

In order to open and close the micro-valve, only a relative displacement of piston 1 and valve housing 38 is required. In the micro-valve described above the clamping element 4 is firmly connected to the valve housing 38 and the drive mechanism moves the piston 1 to and fro in order to displace the opening 44 in the piston 1 relative to the at least one hole 46. Another possibility consists in configuring the clamping elements 3 and 4 such that the clamping force produced by the piezo-actuator 13 is directed onto the inner wall of the valve housing 38 and press-fits the relevant clamping element 3 or 4 in the valve housing 38 so that the piston 1 remains fixed and the drive mechanism 39 displaces the valve housing 38 relative to the piston 1.

Figure 12:
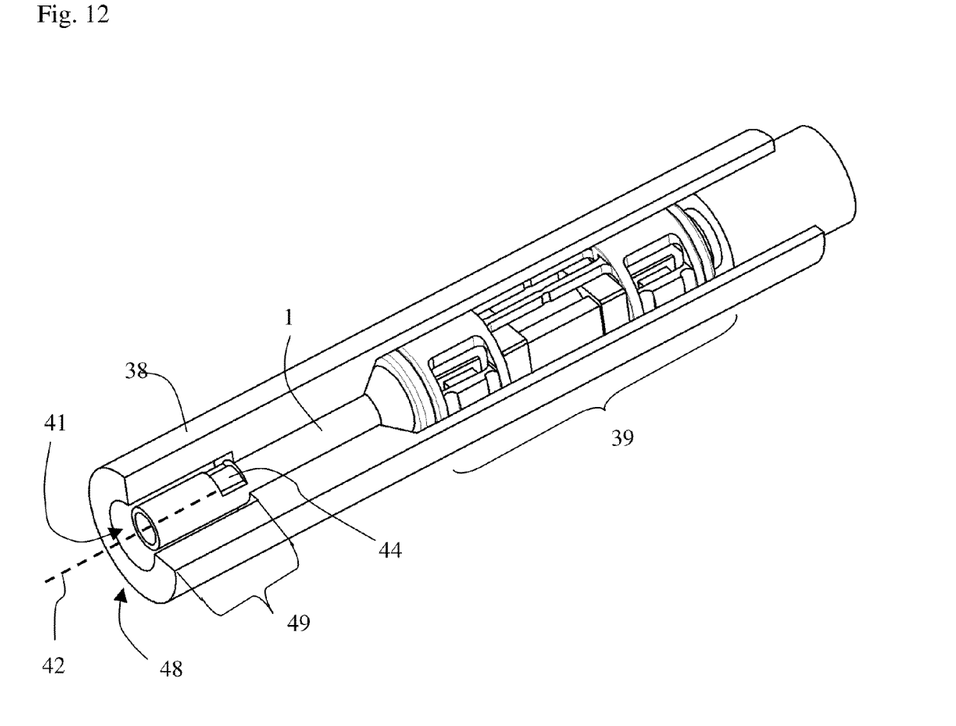

FIG. 12 shows a micro-valve in which the first hole 41 is guided completely through the valve housing 38. A limited section 49 of the first hole 41 adjoining the outlet opening 48 of the first hole 41 has an enlarged cross-section through which the fluid can escape as soon as the opening 44 in the piston 1 lies inside this section 49. The micro-valve is in the "open" state.

Figure 13:
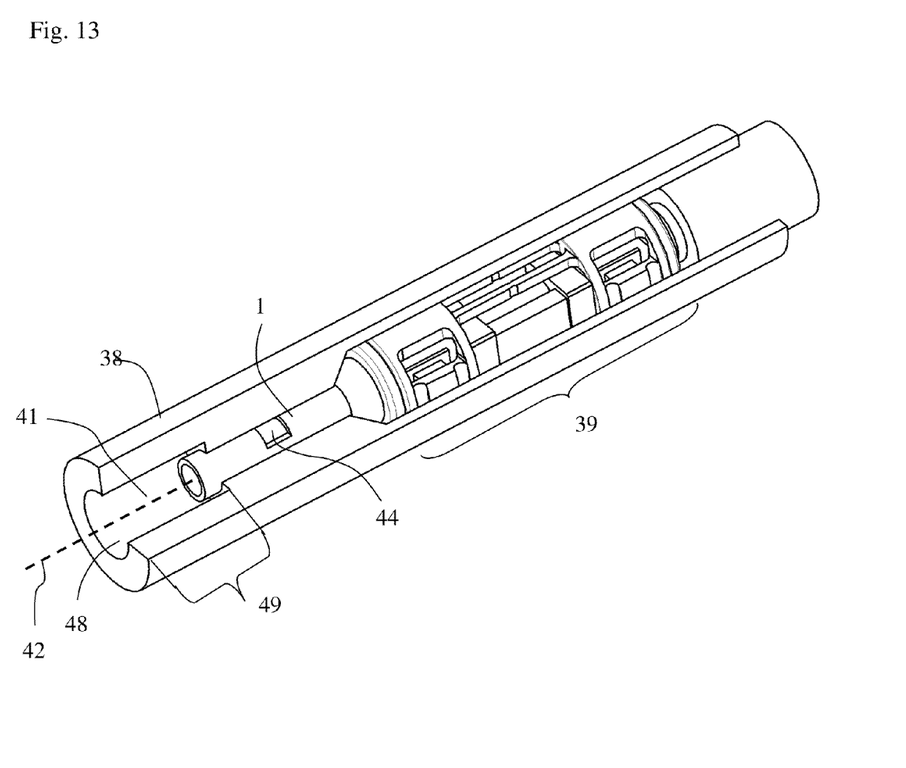

FIG. 13 shows the same micro-valve in the "closed" state: the opening 44 in the piston 1 is sealed by the inner wall of the first hole 41. The piston 1 and the inner wall of the first hole 41 form a gap seal which effectively prevents the escape of fluid.

Figure 14:
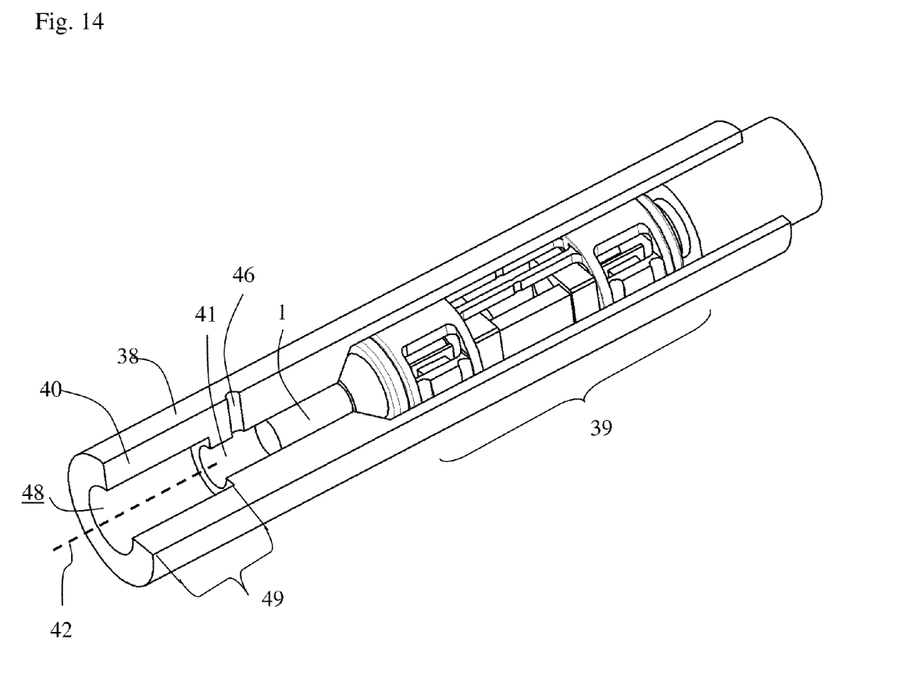

FIG. 14 shows a micro-valve in which the piston 1 is not hollow internally, i.e. the piston 1 is like a bolt or pin. The first hole 41 is guided completely through the head portion 40 of the valve housing 38 and optionally has an expanded cross-section in a section 49 located ahead of the outlet opening 48. The valve housing 38 has at least one further hole 46 which runs obliquely or, as in the example, perpendicularly to the first hole 41 and opens into the first hole 41. The micro-valve is in the "open" state: the fluid is supplied via the hole 46 and removed via the first hole 41 or conversely.

Figure 15:
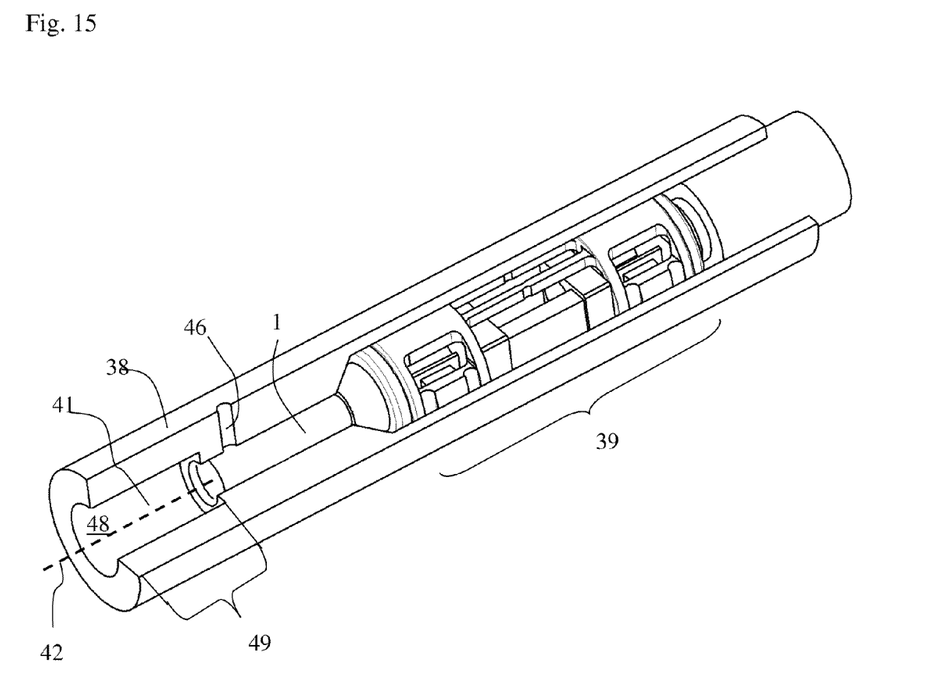

FIG. 15 shows the same micro-valve in the "closed" state: the opening 44 in the piston 1 is sealed by the inner wall of the first hole 41. The piston 1 and the inner wall of the first hole 41 form a gap seal which effectively prevents the escape of the fluid.

Figure 16:
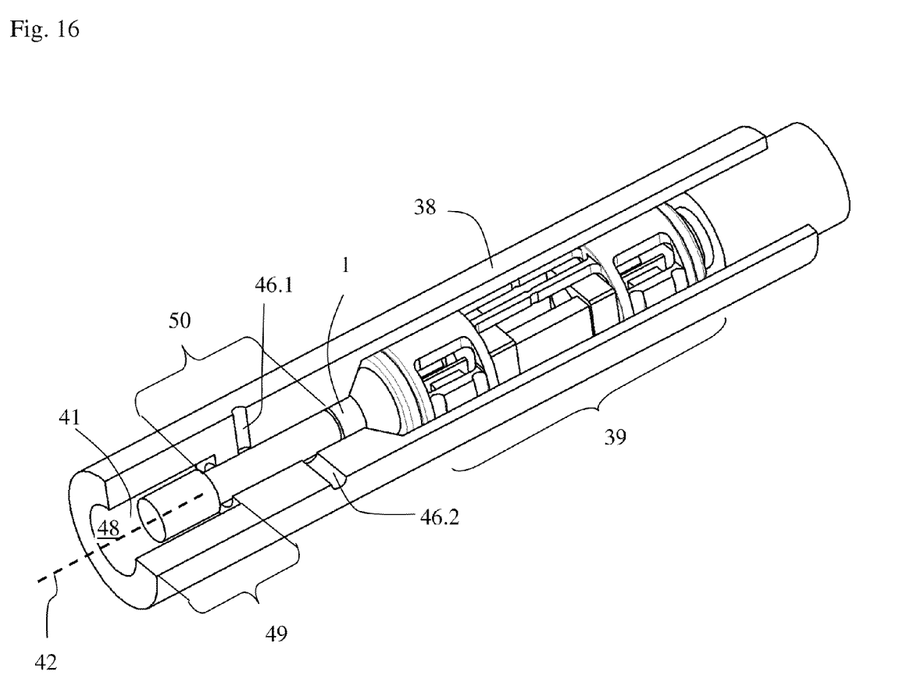

FIG. 16 shows a micro-valve in which the piston 1 is not hollow internally and in which a section 50 of the piston 1 has a reduced cross-section. The piston 1 is located in a position in which the section 50 lies in the region of the two holes 46.1 and 46.2 so that a cavity is formed there between the piston 1 and the inner wall of the first hole 41. The micro-valve is in the "open" state. The fluid is supplied through one hole 46.1 and removed through the other hole 46.2 or conversely. In order to close the micro-valve, the piston 1 is retracted so that the front-most part of the piston 1 covers at least the hole 46.1, preferably both holes 46.1 and 46.2.

Figure 17:
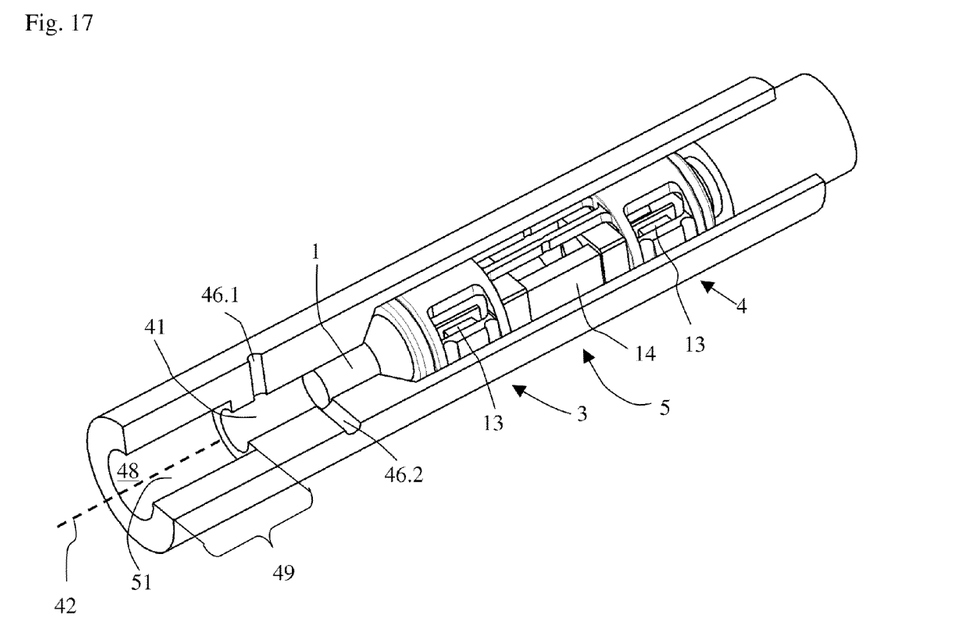

FIG. 17 shows a micro-valve for mixing two gaseous or liquid substances and optionally compressing the mixture. The piston 1 is not hollow internally and a section 49 of the first hole 41 optionally has an expanded cross-section so that an expanded chamber 51 is formed there. In the "open" state the piston 1 is in a retracted position so that one substance passes via the hole 46.1 and the other substance passes via the hole 46.2 into the first hole 41 and into the expanded chamber 51, where the outlet opening 48 is closed by not shown parts of a device to be supplied with the mixture. In the "closed" state the piston 1 is brought into an advanced position in which it closes both holes 46.1 and 46.2. The closer the tip of the piston 1 moves towards the outlet opening 48, the greater the pressure exerted on the mixture. The piezo-actuator 14 of the drive element 5 can preferably be acted upon by an alternating voltage or alternating current whose frequency lies in the ultrasound range. If the piezo-actuator 13 of the clamping element 3 is in the "clamping" state and the piezo-actuator 13 of the clamping element 4 in the "non-clamping state" and the piezo-actuator 14 of the drive element 5 of the drive mechanism 39 is acted upon by an alternating voltage or alternating current, the tip of the piston 1 then executes ultrasound movements which are transferred to the mixture.

In the exemplary embodiments described the piston 1 is passed completely through the drive mechanism 39. However, this is not absolutely essential in each exemplary embodiment, in some exemplary embodiments it is sufficient if only the clamping element 3 can firmly clamp on the piston 1 or it is sufficient if both clamping elements 3 and 4 can press-fit on the valve housing 38. Then, if the fluid is a gaseous substance and the piston 1 is hollow, it is possible to allow the fluid to flow through the chamber 43 and be introduced into the hollow piston only immediately before the first hole 41.

The invention claimed is:

1. A drive mechanism for the movement of an object along an axis of motion, the drive mechanism comprising:
   two clamping elements, and
   a drive element disposed between the two clamping elements which enables a relative movement of the two clamping elements along the axis of motion, wherein each clamping element comprises:
   a base body,
   a piezo-actuator, and
   two clamping jaws, the piezo-actuator serving to displace at least one of the two clamping jaws to produce a clamping force acting on the object which clamping force is directed transversely to the axis of motion, wherein the base bodies of the two clamping elements are directly connected by at least two expansible elements, wherein the drive element comprises a further piezo-actuator serving to displace the base bodies of the two clamping elements relatively to each other along the axis of motion, the further piezo-actuator secured between the base bodies of the two clamping elements such that the at least two expansible elements pre-tension the further piezo-actuator, and
   wherein at least one of the first clamping element, the second clamping element and the drive element comprises a hydraulic amplifier serving to enlarge and transmit a length variation of the associated piezo-actuator to the associated clamping element or drive element, respectively.

2. The drive mechanism according to claim 1, wherein the base bodies of the two clamping elements and the expansible elements are formed from two half-shells.

3. The drive mechanism according to claim 1, wherein the object is a piston and wherein the two clamping elements are mounted with sliding fit on the piston.

4. The drive mechanism according to claim 1, wherein the object is a hollow body and wherein the clamping jaws of one of the two clamping elements are securely mounted with press fit and the clamping jaws of the other of the two clamping elements are mounted with sliding fit on a piston.

5. The drive mechanism according to claim 1, wherein the piezo-actuator of the first clamping element and/or the piezo-actuator of the second clamping element is a piezo-cantilever.

6. A micro-valve comprising:
a valve housing accommodating a drive mechanism and a piston to be moved by the drive mechanism along an axis of motion, the drive mechanism including:
two clamping elements, and
a drive element disposed between the two clamping elements which enables a relative movement of the two clamping elements along the axis of motion, wherein each clamping element comprises:
a base body,
a piezo-actuator, and
two clamping jaws, the piezo-actuator serving to displace at least one of the two clamping jaws to produce a clamping force acting on the piston which clamping force is directed transversely to the axis of motion, wherein the base bodies of the two clamping elements are directly connected by at least two expansible elements, wherein the drive element comprises a further piezo-actuator serving to displace the base bodies of the two clamping elements relatively to each other along the axis of motion, the further piezo-actuator secured between the base bodies of the two clamping elements such that the at least two expansible elements pre-tension the further piezo-actuator, and
wherein at least one of the first clamping element, the second clamping element and the drive element comprises a hydraulic amplifier serving to enlarge and transmit a length variation of the associated piezo-actuator to the associated clamping element or drive element, respectively; and
wherein
the valve housing comprises a side wall running parallel to the axis of motion of the piston and a head portion having a first hole which is in alignment with the axis of motion of the piston, receives a front end of the piston and forms a gap seal with the piston.

7. The micro-valve according to claim 6, wherein the piston is hollow and has an outlet for fluid passage which opens into the first hole of the valve housing and wherein either the side wall of the valve housing has a further hole which opens into the first hole and runs perpendicularly or obliquely to the first hole or the first hole opens into an outlet opening, wherein a cross-sectional area of the first hole is enlarged in a limited section before the outlet opening.

8. The micro-valve according to claim 6, the micro-valve further comprising a control element configured to apply an alternating voltage or alternating current whose frequency lies in the ultrasound range to the further piezo-actuator of the drive element.

9. The micro-valve according to claim 6, wherein the valve housing is cylindrical and wherein the diameter of the valve housing is less than 5 mm.

10. The micro-valve according to claim 7, wherein the valve housing is cylindrical and wherein the diameter of the valve housing is less than 5 mm.

11. A micro-valve comprising:
a valve housing accommodating a drive mechanism and a piston to be moved by the drive mechanism along an axis of motion, the drive mechanism including:
two clamping elements, and
a drive element disposed between the two clamping elements which enables a relative movement of the two clamping elements along the axis of motion, wherein each clamping element comprises:
a base body,
a piezo-actuator, and
two clamping jaws, the piezo-actuator serving to displace at least one of the two clamping jaws to produce a clamping force acting on the piston which clamping force is directed transversely to the axis of motion, wherein the base bodies of the two clamping elements are directly connected by at least two expansible elements, wherein the drive element comprises a further piezo-actuator serving to displace the base bodies of the two clamping elements relatively to each other along the axis of motion, the further piezo-actuator secured between the base bodies of the two clamping elements such that the at least two expansible elements pre-tension the further piezo-actuator, and
wherein at least one of the first clamping element, the second clamping element and the drive element comprises a hydraulic amplifier serving to enlarge and transmit a length variation of the associated piezo-actuator to the associated clamping element or drive element, respectively, wherein the base bodies of the two clamping elements and the expansible elements are formed from two half-shells; and
wherein
the valve housing comprises a side wall running parallel to the axis of motion of the piston and a head portion having a first hole which is in alignment with the axis of motion of the piston, receives a front end of the piston and forms a gap seal with the piston.

12. The micro-valve according to claim 11, wherein the piston is hollow and has an outlet for fluid passage which opens into the first hole of the valve housing and wherein either the side wall of the valve housing has a further hole which opens into the first hole and runs perpendicularly or obliquely to the first hole or the first hole opens into an outlet opening, wherein a cross-sectional area of the first hole is enlarged in a limited section before the outlet opening.

13. The micro-valve according to claim 11, the micro-valve further comprising a control element configured to apply an alternating voltage or alternating current whose frequency lies in the ultrasound range to the further piezo-actuator of the drive element.

14. The micro-valve according to claim 11, wherein the valve housing is cylindrical and wherein the diameter of the valve housing is less than 5 mm.

15. The micro-valve according to claim 12, wherein the valve housing is cylindrical and wherein the diameter of the valve housing is less than 5 mm.

* * * * *